United States Patent [19]

Hamanaka

[11] Patent Number: 4,662,558

[45] Date of Patent: May 5, 1987

[54] SPATTER PREVENTING METHOD

[76] Inventor: Hiroyoshi Hamanaka, 1113-1, Oaza Murakami, Yachiyo-shi, Japan

[21] Appl. No.: 784,939

[22] Filed: Oct. 7, 1985

[51] Int. Cl.$^4$ .......................... B23K 1/20; B23K 9/28; B23K 20/18

[52] U.S. Cl. ............................... 228/118; 219/137 R; 219/137.43

[58] Field of Search ............................... 219/137–143, 219/137 R; 228/118

[56] References Cited

U.S. PATENT DOCUMENTS 3,243,571 3/1966 Schmerling .................... 219/137.43
3,536,888 10/1970 Borneman ....................... 219/137.43

FOREIGN PATENT DOCUMENTS 28386 9/1979 Japan .............................. 219/137.43

Primary Examiner—Michael R. Lusignan
Attorney, Agent, or Firm—Murray and Whisenhunt

[57] ABSTRACT

In welding of metals, spatter preventing effect can be enhanced by spreading on the metal surface a halogen-containing duodimensional polymer having a proper degree of affinity for metals and other materials, being thermoplastic and also having a restoring force and flame resistance as a pretreatment.

10 Claims, No Drawings

SPATTER PREVENTING METHOD

BACKGROUND OF THE INVENTION

1. Field of the Invention

This invention relates to a method for preventing spatter in the course of welding operation of the materials such as soft steel, high tensile steel, stainless steel, etc., of ordinary steel products, steel structures, gas containers, high pressure vessels and the like by spreading and coating a halogen-containing two-dimensional polymer on the work surface as a pretreatment.

2. Description of the Prior Art

Hitherto, as means for preventing spatter which might spoil the visual appearance of the finished article or physically impede the coating work, etc., in the succeeding steps, it has been commonly practiced to dip the object to be welded in silicone oil or a solution of three-dimensional polymers having no affinity for other materials or to apply a spray treatment on the object surface.

These means are indeed capable of producing a spatter preventing effect to a certain extent, but such treatments are also liable to adversely affect the joining strength of the weld. Non-affinity of the treating material for other materials is also an unfavorable factor as it tends to cause non-uniform deposit or peeling of the deposit in the surface treatment such as coating or plating.

A further defect of said conventional means is poor retention of the spatter preventive effect in multilayer welding.

SUMMARY OF THE INVENTION

The present invention has for its object to provide a novel spatter preventing method which is free of said prior art problems.

As a result of extensive studies, the present inventors found that the spatter preventive effect can be eminently elevated and said prior art defects can be entirely eliminated by using as spatter preventive agent a halogen-containing two-dimensional polymer which has a proper degree of affinity for metals and other materials, is thermoplastic and also has a restoring force and flame resistance.

Thus, the present invention provides a spatter preventing method featuring use of one or more halogen-containing two-dimensional polymers having a proper degree of affinity for metals and other materials, being thermoplastic and also having a restoring force and flame resistance.

PREFERRED EMBODIMENTS OF THE INVENTION

Said halogen-containing two-dimensional polymers used in this invention are preferably those polymers (hereinafter referred to as specific polymers) which are represented by the following general formula I:

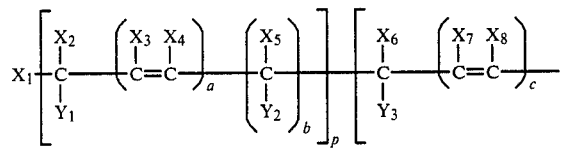

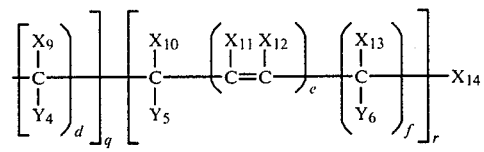

(wherein $X_1$, $X_2$, $X_5$, $X_6$, $X_9$, $X_{10}$, $X_{13}$ and $X_{14}$ represent a member selected from the group consisting of hydrogen, halogen, methyl group and ethyl group; $X_3$, $X_4$, $X_7$, $X_8$, $X_{11}$ and $X_{12}$ are paired into $X_3$ and $X_4$, $X_7$ and $X_8$, and $X_{11}$ and $X_{12}$, in each of which pairs one or both are hydrogen or halogen, or one is hydrogen and the other is methyl group; $Y_1$, $Y_2$, $Y_3$, $Y_4$, $Y_5$ and $Y_6$ represent a member selected from the group consisting of hydrogen, halogen, hydrocarbon group having 22 or less carbon atoms, halomethyl group, heloethyl group, dihaloethyl group, halophenyl group, halomethylphenyl group, hydroxyl group, 3-halo-2-hydroxypropoxy group, hydroxyalkoxy group having 8 or less carbon atoms, carboxyl group, nitrile group, epoxy group, dihydroxyethyl group, 2-halo-1-hydroxyethyl group, 1-halo-2-hydroxyethyl group,

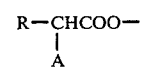

group (wherein R represents hydrogen or hydrocarbon group having 20 or less carbon atoms, and A represents hydrogen or halogen),

group (wherein R represents hydrogen or hydrocarbon group having 20 or less carbon atoms, and A represents hydrogen or halogen),

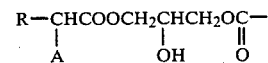

group (wherein R represents hydrogen or hydrocarbon group having 20 or less carbon atoms, and A represents hydrogen or halogen),

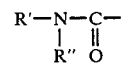

group (wherein R' and R" represent a member selected from the group consisting of hydrogen, hydrocarbon group having 22 or less carbon atoms, and hydroxyhydrocarbon group having 8 or less carbon atoms),

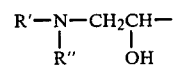

group (wherein R' and R" represent a member selected from the group consisting of hydrogen, hydrocarbon group having 22 or less carbon atoms, and hydroxyhydrocarbon group having 8 or less carbon atoms),

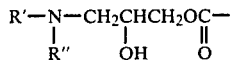

group (wherein R' and R" represent a member selected from the group consisting of hydrogen, hydrocarbon group having 22 or less carbon atoms, and hydroxyhydrocarbon group having 8 or less carbon atoms),

group (wherein R''' represents a member selected from the group consisting of halomethyl group, haloethyl group, hydroxyhalopropyl group, hydrocarbon group having 22 or less carbon atoms, and hydroxyhydrocarbon group having 8 or less carbon atoms),

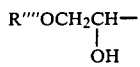

group (wherein R'''' represents a member selected from the group consisting of halomethyl group, haloethyl group, hydrocarbon group having 22 or less carbon atoms, and hydroxyhydrocarbon group having 8 or less carbon atoms), and

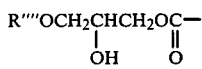

group (wherein R'''' represents a member selected from the group consisting of halomethyl group, haloethyl group, hydrocarbon group having 22 or less carbon atoms, and hydroxyhydrocarbon group having 8 or less carbon atoms); a, b, c, d, e and f represent a number of 0 or 1, at least one of them representing 1; and p, q and r are the numbers satisfying the following relations: $0 \leq p \leq 10,000$, $0 \leq q \leq 10,000$, $0 \leq r \leq 10,000$, and $50 \leq p+q+r \leq 10,000$ and wherein at least one of $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $Y_1$, $Y_2$, $Y_3$, $Y_4$, $Y_5$ and $Y_6$ is halogen or halogen-containing group).

The specific polymers are the addition-polymerizable polymers or chemically modified products thereof which can be easily obtained by known radical polymerization or ionic polymerization. The monomer composition thereof is not limited to one type. In accordance with this invention, said specific polymer(s) is spread on the object to be welded, after dispersing, emulsifying or dissolving said polymer in water or an organic solvent.

In case of using the polymers outside the specified ranges of this invention, for example, the polymers of formula I in which p+q+r is less than 50 or greater than 10,000, a flow loss is caused or the spread polymer film proves to be extremely poor in restorability, so that the spatter preventive effect by such polymers is limited to a very short period of time.

Also, in case of using the polymers having no halogen or halogen-containing group in the definition of formula I, a combustion loss is caused and, in this case, too, only a very short-time spatter preventive effect is provided.

Among the specified polymers used in this invention, the following can be cited as those showing the particularly high performance: poly(2-chlorobutadiene), partially brominated polybutadiene, chlorinated polyisoprene, hydrochloric acid addition products of epoxidized polybutadiene, hydrobromic acid addition products of epoxidized polybutadiene, monochloroacetic acid addition products of epoxidized polybutadiene, chlorinated butene-isoprene copolymer, chlorinated styrene-butadiene copolymer, butadiene-vinylbenzyl chloride copolymer and the like. These polymers exhibit resiliency as they have unsaturated bonds in the molecule, and owing to such resiliency, the coated polymer film can absorb the impact force of hot metal particles released from the welding material on the surface of the object to be welded and also shows an action of wrapping up such metal particles. These actions, coupled with the strong interfacial adsorptivity of carbon-halogen bonds, enable long-time retention of the desired spatter preventive effect.

In the spatter preventing method according to this invention, it is free to add, as desired, polyalkylene glycol as lubricant or ethylene glycol or glycol ether solvent as anti-freeze.

The present invention will be further described below by way of the examples thereof.

EXAMPLE 1

In a five-necked flask equipped with a stirrer, a thermometer, a dropping funnel, a gas inlet tube and a reflux condenser, 100 g of 2-chlorobutadiene was contacted with 150 g of an aqueous solution containing 5 g of sodium rosinate, and then 0.5 g of potassium persulfate was supplied into the flask to conduct addition polymerization in an $N_2$ gas stream at 30°–40° C. to produce poly(2-chlorobutadiene) having an average polymerization degree of 2,000. This polymerization product was further contacted with 1,000 g of a 3% aqueous solution of poly(10 mol) oxyethylene nonylphenyl ether to prepare a stable emulsion as a final product (spatter preventive).

EXAMPLE 2

By using the same apparatus as used in Example 1, 50 g of 2-chlorobutadiene and 450 g of water were supplied and emulsified by adding 1 g of sodium deodecylsulfate and 2 g of poly(8 mol)oxyethylene dodecyl ether. To this emulsified solution were added 0.25 g of ammonium persulfate and 0.15 g of sodium sulfite to conduct addition polymerization at 20°–25° C. to obtain an emulsion of poly(2-chlorobutadiene) having an average polymerization degree of 10,000 as a final preparation.

EXAMPLE 3

40 g of 2-chlorobutadiene was put into a 50 ml polymerization bottle and left stationary at 20° C. Then, after confirming the rise of viscosity, the whole amount of the content was transferred into 160 g of carbon tetrachloride and dissolved to prepare a solution of poly(2-chlorobutadiene) with an average polymerization degree of 50 as a final product.

EXAMPLE 4

100 g of 2,3-dichlorobutadiene and 0.2 g of thiophenol were supplied into the same apparatus as used in Example 1 and polymerized at 25° C. After confirming the rise of viscosity, 900 g of chloroform was poured into the flask to prepare a solution of poly(2,3- dichlorobutadiene) having an average polymerization of 200 as a final product.

EXAMPLE 5

1,000 g of a 10% chloroform solution of poly(2,3-dichlorobutadiene) having an average polymerization degree of 50 was prepared in the same way as Example 4, and 128 g of bromine was reacted therewith to obtain a final product.

EXAMPLE 6

54 g of polybutadiene with an average polymerization degree of 50 was dissolved in 1,200 g of pentane, and then 80 g of bromine was reacted with the solution to obtain a final product.

EXAMPLE 7

900 g of a 5% n-heptane solution of polyisoprene having an average polymerization degree of 10,000 was prepared and 12 g of chlorine was reacted therewith to form a final product.

EXAMPLE 8

106 g of chlorine was reacted with 1,240 g of a 10% carbon tetrachloride solution of buteneisoprene (1:1) polymer having an average molecular weight of 100,000 to prepare a final product.

EXAMPLE 9

232.4 g of epoxidized polybutadiene having an oxygen content of 6.89% and an average polymerization degree of 50 was added into a solution of 10 g of poly(24 mol)oxyethylene sorbitane monooleate in 1,000 g of water to form an emulsion, and 50 g of a 36% hydrochloric acid solution was reacted therewith to prepare a final product.

EXAMPLE 10

116 g of epoxidized polybutadiene having an oxygen content of 6.89% and an average polymerization degree of 1,000 was added into a solution of 8 g of poly(10 mol)oxyethylene isotridecyl ether in 1,000 g of water to form an emulsion, and 122.6 g of a 66% hydrobromic acid solution was reacted therewith to form a final product.

EXAMPLE 11

55.7 g of epoxidized polybutadiene having an oxygen content of 2.87% and an average polymerization degree of 200 was added into a solution of 3 g of poly(10 mol)oxyethylene nonylphenyl ether in 400 g of water to form an emulsion, and 76.8 g of a 50% hydroiodic acid solution was reacted therewith to prepare a final product.

EXAMPLE 12

465 g of epoxidized polybutadiene having an oxygen content of 6.89% and an average polymerization degree of 300 was dissolved in 2,500 g of carbon tetrachloride, and then 90 g of behenyl-2-hydroxyoctylamine, 9.6 g of methyl-2-hydroxyethylamine and 40.3 g of ethylenechlorohydrin were reacted therewith to form a final preparation.

EXAMPLE 13

465 g of epoxidized polybutadiene having an oxygen content of 6.89% and an average polymerization degree of 50 was reacted with 32.7 g of behenyl alcohol, 16 g of methyl alcohol, 6.7 g of monochloromethyl alcohol and 12.5 g of ethyleneboromohydrin by using 1 g of boron trifluoride etherate, and then further reacted with 30 g of a 28% ammonia water. Thereafter, 3,000 g of water and 20 g of poly(14 mol)oxyethylene oleyl ether were added into the solution and the mixed solution was emulsified and further reacted with 40.5 g of a 37% formaldehyde solution to prepare a final product.

EXAMPLE 14

34 g of epoxidized polybutadiene having an oxygen content of 4.76% and an average polymerization degree of 10,000 was dissolved in 1,000 g of n-heptane, and this solution was reacted with 5 g of 2,2,4-trimethylpentane-1,3-diol in the presence of 0.1 g of boron trifluoride etherate and then further reacted with 21 g α-bromobehenic acid to form a final product.

EXAMPLE 15

100 g of epoxidized polybutadiene with an oxygen content of 4.76% and an average polymerization degree of 800 was dissolved in 2,000 g of carbon tetrachloride, and then 17 g of behenic acid, 14 g of oleic acid, 6 g of acetic acid and 11.6 g of monochloroacetic acid were reacted therewith to prepare a final product.

EXAMPLE 16

34 g of behenic acid, 42 g of α-bromobehenic acid, 18 g of acetic acid and 47.3 g of monochloroacetic acid were reacted with 2,300 g of a 10% ethylene dichloride solution of methyl acrylate-glycidyl methacrylate (1:1) copolymer having an average molecular weight of 6,000 to prepare a final product.

EXAMPLE 17

11 g of behenylamine, 20 g of 28% ammonia water and 30 g of a 50% dimethylamine aqueous solution were reacted with 2,775 g of a 10% ethylene dichloride solution of chloromethyl methacrylated-glycidyl methacrylate (1:1) copolymer having an average molecular weight of 30,000, and then 1 g of a 37% formaldehyde aqueous solution was further reacted therewith. Thereafter, 30 g of water was distilled out of the system and the residue was collected as a final product.

EXAMPLE 18

94.7 g of 2-hydroxyoctyl-2-hydroxyethylamine was reacted with 2,315 g of a 10% ethylene dichloride solution of 2-chloroethyl acrylate-glycidyl methacrylate (2:1) copolymer having an average molecular weight of 100,000 to prepare a final product.

EXAMPLE 19

A 1% aqueous solution of acrylamide-3-bromoethoxy-2-hydroxypropyl methacrylate (40:1) copolymer having an average molecular weight of 750.000 was prepared as a final product.

EXAMPLE 20

14.6 g of 2,2,4-trimethylpentane-1,3-diol, 8.1 g of ethylene chlorohydrin and 32.7 g of behenyl alcohol were reacted with 1,518 g of a 10% dichlorobenzene solution of 2-hydroxyphenetyl acrylate-glycidyl methacrylate-methallyl chloride (2:2:1) terpolymer having an average molecular weight of 7,600 in the presence of 0.1 g of boron tetrafluoride etherate, and then 8.1 g of a 37% formaldehyde aqueous solution was further reacted therewith. Thereafter, 5 g of water was distilled out of the system to obtain a final product.

EXAMPLE 21

34 g of behenic acid and 42 g of α-bromobehenic acid were reacted with 1,720 g of a 5% ethylene dichloride solution of polyvinyl acetate having an average polymerization degree of 10,000 in the presence of 0.2 g of p-toluenesulfonic acid, and then 12 g of acetic acid was distilled out of the system to prepare a final product.

EXAMPLE 22

22.6 g of monochloroacetic acid chloride was reacted with 1,470 g of a 5% dioxane solution of 30% saponified polyvinyl acetate having an average polymerization degree of 50, and then 7.2 g of hydrogen chloride was removed out of the system to obtain a final product.

EXAMPLE 23

An 8% cyclohexane solution of butadiene-methyl methacrylate-chloromethyl methacrylate (2:1:1) terpolymer having an average molecular weight of 750,000 was prepared as a final product.

EXAMPLE 24

35.5 g of chlorine was reacted with 2,760 g of a 10% ethylene dichloride solution of methyl acrylatestyrene (2:1) copolymer having an average molecular weight of 50,000 to obtain a final product.

EXAMPLE 25

A styrene-mono(2-bromoethyl)maleate (1:1) copolymer having an average molecular weight of 8,200 as a final product was synthesized in a 10% solution of n-butyl alcohol.

EXAMPLE 26

216.2 g of methylstyrene-maleic anhydride (1:1) copolymer having an average molecular weight of 11,000 was dispersed in tetrahydrofuran and simultaneously reacted with 163 g of behenyl alcohol and 40.3 g of ethylene chlorohydrin and then further reacted with 64.1 g of octene oxide and 15 g of paraformaldehyde to prepare a final product.

EXAMPLE 27

5,375 g of a 3% isopropyl acetate solution of butadiene-acrylonitrile (2:1) copolymer having an average molecular weight of 800,000 was reacted with 8 g of bromine to prepare a sample product.

EXAMPLE 28

1,600 g of a 20% ethylene dichloride solution of butadiene-styrene (4:1) copolymer having an average molecular weight of 3,200 was reacted with 35.5 g of chlorine to prepare a sample product.

EXAMPLE 29

232.4 g of epoxidized polybutadiene with an oxygen content of 6.89% and an average polymerization degree of 50 and 18 g of water were reacted in the presence of 2.5 g of sulfuric acid and then 2.75 g of a 36% hydrochloric acid solution was further reacted therewith. The reaction product was contacted with a solution of 3 g of poly(18 mol)oxyethylene cetyl ether in 400 g of water and brought into an emulsion to prepare a final product.

EXAMPLE 30

435 g of a 20% xylene solution of tetracosenemaleic anhydride (1:1) copolymer was reacted with 16.1 g of ethylene chlorohydrin and then further reacted with 18.5 g of epichlorohydrin to obtain a final product.

EXAMPLE 31

1,470 g of a 10% dioxane solution of 30% saponified polyvinyl acetate having an average polymerization degree of 200 was reacted with 27.8 g of epichlorohydrin, 25.6 g of octene oxide and 3 g of paraformaldehyde in the presence of 0.3 g of boron trifluoride etherate to prepare a final product.

EXAMPLE 32

A 5% ethylene dichloride solution of butadiene(3-chloro-2-hydroxypropyl)methacrylate (3:1) copolymer having an average molecular weight of 150,000 was prepared as a final product.

EXAMPLE 33

A 10% n-butyl acetate solution of vinyl chloride-vinyl acetate (3:1) copolymer having an average molecular weight of 40,000 was prepared as a final product.

EXAMPLE 34

A 20% water suspension of vinyl chloride-vinylidene chloride (1:4) copolymer having an average molecular weight of 100,000 (containing 4% of sodium dodecylsulfate and 1% of poly(6 mol)oxyethylene lauryl ether as suspending agent) was prepared as a final product.

EXAMPLE 35

A 5% xyelene-disisobutyl ketone (1:1 by volume) solution of 20% chlorinated polypropylene having an average molecular weight of 400,000 was prepared as a final product.

EXAMPLE 36

A 10% tetrahydrofuran solution of 30% chlorinated polyethylene having an average molecular weight of 300,000 was prepared as a final product.

EXAMPLE 37

15 g of polyethylene tetrafluoride having a particle size of $0.2\mu$ and an average polymerization degree of 50 was dispersed stably in 100 g of a kerosine solution containing 0.3 g of calcium dodecylbenzenesulfonate and 0.4 g of barium oleate to prepare a final product.

EXAMPLE 38

250.7 g of vinylbenzyl chloride-maleic anhydride (1:1) copolymer having an average molecular weight of 10,000 was reacted, while being dispersed in 2,500 g of tetrahydrofuran, with 169.8 g of behenyl methylamine and 72.6 g of 2-hydroxyoctylamine and then further reacted with 45 g of paraformaldehyde to prepare a final product.

A list of the halogen-containing two-dimensional polymers obtained in Examples 1–38 is shown in Table 8 given later.

EXAMPLE 39

Two pieces of ordinary structural rolled steel SS 34 of JIS G-3101 (10 cm×15 cm×0.9 cm in size) were used as test specimens, and they were immersed in each of the final products (spatter preventives) of Examples 1-38 for five seconds and then heated at 100° C. for 30 minutes to remove the solvent or dispersing medium. Then the test specimens were subjected to manual butt welding with a welding rod D-4301 of JIS Z-3211 (1.6 mm in diameter) by applying a secondary current of 40 A and a secondary voltage of 8 V, and the spatter preventing effect and the relating performance of said spatter preventives were observed. The results are shown in Table 1.

As the comparative materials, the following six polymers were selected and the solutions thereof were subjected to the test.

| | |
|---|---|
| Comparative material I | 10% emulsion of polybutadiene with average polymerization degree of 20,000 |
| Comparative material II | 15% emulsion of polyvinyl acetate with average polymerization degree of 1,000 |
| Comparative material III | 10% dioxane solution of polyoxypropylene glyceryl ether with average molecular weight of 10,000 |
| Comparative material IV | 10% xylene solution of polymethylsiloxane with average molecular weight of 5,000 |
| Comparative material V | 10% emulsion of poly(2-chlorobutadiene) with average polymerization degree of 40 |
| Comparative material VI | 10% emulsion of poly(2-chlorobutadiene) with average polymerization degree of 11,000. |

TABLE 1

Results of spatter preventing treatment on ordinary structural rolled steel (I)

| Agents tested | Spatter preventive effect[a] 1-layer build-up | Spatter preventive effect[a] 2-layer build-up | Joining[b] | Removability of residual spatter[c] | Platability[d] | Coatability[e] |
|---|---|---|---|---|---|---|
| Blank (no spatter preventive used) | E | E | A | D | o | o |
| Spatter preventive of Example 1 | A | A' | A | A | o | o |
| Spatter preventive of Example 2 | A | A | A | A | o | o |
| Spatter preventive of Example 3 | A' | A' | A | B | o | o |
| Spatter preventive of Example 4 | A | A' | A | B | o | o |
| Spatter preventive of Example 5 | A' | B | A | B | Δ | o |
| Spatter preventive of Example 6 | A | A' | A | A | o | o |
| Spatter preventive of Example 7 | A' | A' | A | A | o | o |
| Spatter preventive of Example 8 | A | A' | A | B | o | o |
| Spatter preventive of Example 9 | A' | A' | A | A | o | o |
| Spatter preventive of Example 10 | A | A' | A | A | Δ | o |
| Spatter preventive of Example 11 | A' | B | A | B | o | o |
| Spatter preventive of Example 12 | A' | B | B | A | o | o |
| Spatter preventive of Example 13 | A' | A' | B | A | Δ | o |
| Spatter preventive of Example 14 | A' | A' | B | A | Δ | o |
| Spatter preventive of Example 15 | A | A' | B | A | Δ | o |
| Spatter preventive of Example 16 | A' | B | B | A | Δ | o |
| Spatter preventive of Example 17 | A' | B | A | B | o | o |
| Spatter preventive of Example 18 | A' | B | A | B | o | o |
| Spatter preventive of Example 19 | B | B | A | B | o | o |
| Spatter preventive of Example 20 | A' | B | B | A | Δ | o |
| Spatter preventive of Example 21 | A' | A' | B | A | Δ | o |
| Spatter preventive of Example 22 | A | A' | A | B | o | o |
| Spatter preventive of Example 23 | B | B | A | B | o | o |
| Spatter preventive of Example 24 | A' | B | B | A | Δ | o |
| Spatter preventive of Example 25 | B | B | A | B | o | o |
| Spatter preventive of Example 26 | B | B | A | B | o | o |
| Spatter preventive of Example 27 | A' | B | A | A | o | o |
| Spatter preventive of Example 28 | A' | A' | A | A | Δ | o |
| Spatter preventive of Example 29 | A' | A' | A | B | o | o |
| Spatter preventive of Example 30 | A' | B | B | A | Δ | o |
| Spatter preventive of Example 31 | B | B | A | B | o | o |
| Spatter preventive of Example 32 | A' | B | A | B | o | o |
| Spatter preventive of Example 33 | A' | B | A | B | o | o |
| Spatter preventive of Example 34 | A' | A' | B | B | o | o |
| Spatter preventive of Example 35 | A' | B | A | B | o | o |
| Spatter preventive of Example 36 | A' | B | A | B | o | o |
| Spatter preventive of Example 37 | A | A' | B | A | Δ | Δ |
| Spatter preventive of Example 38 | B | B | A | B | o | o |
| Comparative material I | C | D | B | D | Δ | Δ |
| Comparative material II | D | E | C | D | x | o |
| Comparative material III | D | D | D | D | Δ | x |
| Comparative material IV | B | D | D | D | x | x |
| Comparative material V | C | E | B | D | o | o |
| Comparative material VI | C | D | B | D | Δ | Δ |

Notes
[a]The evaluation of spatter preventive effect was made according to the following A to E rating criteria.
(The same applies to the evaluation in Tables 2–7 given later.)
A: No trace of spatter was seen on the weldment.
A': Slight deposition of spatter was seen in the area up to 2 cm from the weld.
B: Slight deposition of spatter was seen in the area up to 5 cm from the weld.
C: Heavy deposition of spatter was seen in the area up to 2 cm from the weld.
D: Heavy deposition of spatter was seen in the area up to 5 cm from the weld.
E: Deposition of spatter was seen in the area exceeding 5 cm from the weld.
[b]The evaluation of joining was made by attaching to the weld zone a photographic printing paper which had been dipped

TABLE 1-continued in a 5% sulfuric acid solution, and observing the transferred sulfur print. The following rating was used as evaluation criteria:
A: Almost no sulfur band existed.
B: Short sulfur band existed scantly.
C: Short sulfur band existed in places.
D: Long sulfur band existed in places.
[c]Removability of residual spatter was compared by the difference in pressure required for removing spatter remaining on the specimen surface after two-layer build-up by rubbing the specimen surface with an 18-8 stainless wire brush of 0.03 mm in diameter. Evaluation was made according to the following rating:
A: Residual spatter could be removed by sweeping under pressure of 25 kg/cm$^2$ or below.
B: Residual spatter could be removed by sweeping under pressure 26–50 kg/cm$^2$.
C: Residual spatter could be removed by sweeping under pressure of 51–75 kg/cm$^2$.
D: Residual spatter could be removed by sweeping under pressure of 76 kg/cm$^2$ or above.
[d]For the evaluation of platability, flame spray plating was conducted under the condition that zinc fused at 550° C. would be adsorbed in an amount of 275 g/m$^2$ on the specimen surface after one-layer build up, and the state of spread of the zinc film was observed. The state of spread was rated as follows:
o: good, Δ: ordinary, x: bad.
[e]For the evaluation of coatability, a rust resistant paint prepared by uniformly dispersing 40 parts of a 4:1 mixture of red lead and boiled oil in 60 parts of mineral spirit was coated on the specimen surface after one-layer build up at normal temperature by a polyester-made brush, and the state of spread of the coating was observed. The state of spread was rated as follows:
o: good, Δ: ordinary, x: bad.

EXAMPLE 40

Two pieces of structural rolled steel SS 34 of JIS G-3101 (10 cm×15 cm×0.9 cm in size) were used as test specimens. The surface of each specimen was sprayed with each of the spatter preventive preparations of Example 1–38 for 10 seconds and then allowed to stand at 20° C. and 40% RH for 48 hours to remove the solvent or dispersing medium. Then manual fillet welding was conducted on said specimen surface with a secondary current of 35 A and a secondary voltage of 8 V by using a welding rod D-4311 of JIS Z-3211 (1.6 mm in diameter). The spatter preventing effect and relating performance of the tested spatter preventives were observed, the results being shown in Table 2.

Comparative materials I–VI used in Example 39 were also tested in the same way.

TABLE 2

Results of spatter preventing treatment on ordinary structural rolled steel (II)

| Agents tested | Spatter preventive effect[a] 1-layer build-up | Spatter preventive effect[a] 2-layer build-up | Joining[b] | Removability of residual spatter[c] | Platability[d] | Coatability[e] |
|---|---|---|---|---|---|---|
| Blank (no spatter preventive used) | E | E | A | D | Δ | o |
| Spatter preventive of Example 1 | A' | A' | A | A | o | o |
| Spatter preventive of Example 2 | A | A' | A | A | o | o |
| Spatter preventive of Example 3 | A | A' | A | B | o | o |
| Spatter preventive of Example 4 | A | A' | A | B | Δ | o |
| Spatter preventive of Example 5 | A' | B | B | B | Δ | o |
| Spatter preventive of Example 6 | A' | A' | B | A | o | o |
| Spatter preventive of Example 7 | A' | B | A | B | o | o |
| Spatter preventive of Example 8 | A' | B | A | B | o | o |
| Spatter preventive of Example 9 | A' | A' | A | B | o | o |
| Spatter preventive of Example 10 | A | A' | B | A | o | o |
| Spatter preventive of Example 11 | A' | B | A | | Δ | o |
| Spatter preventive of Example 12 | A' | B | B | A | o | o |
| Spatter preventive of Example 13 | A' | A' | B | A | Δ | o |
| Spatter preventive of Example 14 | A' | B | B | A | Δ | o |
| Spatter preventive of Example 15 | A | A' | B | A | Δ | o |
| Spatter preventive of Example 16 | A' | B | B | A | Δ | o |
| Spatter preventive of Example 17 | A' | B | A | B | o | o |
| Spatter preventive of Example 18 | A' | B | A | B | o | o |
| Spatter preventive of Example 19 | B | B | A | B | o | o |
| Spatter preventive of Example 20 | A' | B | B | A | Δ | o |
| Spatter preventive of Example 21 | A' | A' | B | A | Δ | o |
| Spatter preventive of Example 22 | A' | A' | A | B | o | o |
| Spatter preventive of Example 23 | B | B | A | B | o | o |
| Spatter preventive of Example 24 | A' | B | B | A | Δ | o |
| Spatter preventive of Example 25 | B | B | A | B | o | o |
| Spatter preventive of Example 26 | B | B | A | B | o | o |
| Spatter preventive of Example 27 | A' | B | A | A | o | o |
| Spatter preventive of Example 28 | A' | B | A | A | Δ | o |
| Spatter preventive of Example 29 | A' | B | A | B | o | o |
| Spatter preventive of Example 30 | A' | B | B | A | Δ | o |
| Spatter preventive of Example 31 | B | B | A | B | o | o |
| Spatter preventive of Example 32 | A' | B | A | B | o | o |
| Spatter preventive of Example 33 | A' | B | A | B | o | o |
| Spatter preventive of Example 34 | A' | B | A | B | o | o |
| Spatter preventive of Example 35 | A' | B | A | B | o | o |
| Spatter preventive of Example 36 | A' | B | A | B | o | o |
| Spatter preventive of Example 37 | A | A' | B | A | Δ | Δ |
| Spatter preventive of Example 38 | B | B | A | B | o | o |
| Comparative material I | C | E | B | D | Δ | Δ |
| Comparative material II | D | E | C | D | x | o |

TABLE 2-continued

| | Results of spatter preventing treatment on ordinary structural rolled steel (II) | | | | | |
|---|---|---|---|---|---|---|
| | Spatter preventive effect[a] | | | | | |
| Agents tested | 1-layer build-up | 2-layer build-up | Joining[b] | Removability of residual spatter[c] | Platability[d] | Coatability[e] |
| Comparative material III | D | E | D | D | Δ | x |
| Comparative material IV | B | D | D | D | x | x |
| Comparative material V | C | E | B | D | Δ | o |
| Comparative material VI | C | E | B | D | Δ | Δ |

EXAMPLE 41

Two pieces of ordinary structural rolled steel SS-55 of JIS G-3101 (10 cm×15 cm×1.2 cm in size) were used as test specimens, and the surface of each specimen was sprayed with each of the spatter preventives of Examples 1-38 for 10 seconds and then heated at 150° C. for 15 minutes to remove the solvent or dispersing medium. Then $CO_2$ gas butt welding was conducted on said specimen wih a welding current of 350 A and an arc voltage of 25 V by using a core wire (2.0 mm in diameter) made of the same material as SM-41-C of JIS G-3106, and the spatter preventing effect and relating performance of the spatter preventives were observed, obtaining the results shown in Table 3.

Comparative materials I-VI used in Example 39 were likewise tested.

TABLE 3

| | Results of spatter preventing treatment on ordinary structural rolled steel (III) | | | | | |
|---|---|---|---|---|---|---|
| | Spatter preventive effect[a] | | | | | |
| Agents tested | 1-layer build-up | 2-layer build-up | Joining[b] | Removability of residual spatter[c] | Platability[d] | Coatability[e] |
| Blank (no spatter preventive used) | E | E | A | D | o | o |
| Spatter preventive of Example 1 | A | A' | A | A | o | o |
| Spatter preventive of Example 2 | A | A | A | A | o | o |
| Spatter preventive of Example 3 | A | A' | A | A | o | o |
| Spatter preventive of Example 4 | A | A' | A | B | o | o |
| Spatter preventive of Example 5 | A' | B | B | B | o | o |
| Spatter preventive of Example 6 | A | A | A | A | o | o |
| Spatter preventive of Example 7 | A' | A' | A | A | o | o |
| Spatter preventive of Example 8 | A' | A' | A | B | o | o |
| Spatter preventive of Example 9 | A | A' | A | A | o | o |
| Spatter preventive of Example 10 | A | A' | A | A | Δ | o |
| Spatter preventive of Example 11 | A | B | A | B | Δ | o |
| Spatter preventive of Example 12 | A' | A' | B | A | o | o |
| Spatter preventive of Example 13 | A' | A' | B | A | Δ | o |
| Spatter preventive of Example 14 | A' | A' | B | A | Δ | o |
| Spatter preventive of Example 15 | A | A' | B | A | Δ | o |
| Spatter preventive of Example 16 | A' | A' | B | A | Δ | o |
| Spatter preventive of Example 17 | A' | B | A | B | o | o |
| Spatter preventive of Example 18 | A' | B | A | B | o | o |
| Spatter preventive of Example 19 | B | B | A | B | o | o |
| Spatter preventive of Example 20 | A' | B | B | A | Δ | o |
| Spatter preventive of Example 21 | A' | A' | B | A | Δ | o |
| Spatter preventive of Example 22 | A | A' | A | A | o | o |
| Spatter preventive of Example 23 | A' | B | A | B | o | o |
| Spatter preventive of Example 24 | A' | B | B | A | Δ | o |
| Spatter preventive of Example 25 | B | B | A | B | o | o |
| Spatter preventive of Example 26 | B | B | A | B | o | o |
| Spatter preventive of Example 27 | A' | A' | A | A | o | o |
| Spatter preventive of Example 28 | A' | A' | A | A | Δ | o |
| Spatter preventive of Example 29 | A' | A' | A | B | o | o |
| Spatter preventive of Example 30 | A' | B | B | A | Δ | o |
| Spatter preventive of Example 31 | B | B | A | B | o | o |
| Spatter preventive of Example 32 | A' | A' | A | B | o | o |
| Spatter preventive of Example 33 | A' | B | A | B | o | o |
| Spatter preventive of Example 34 | A' | A' | B | B | o | o |
| Spatter preventive of Example 35 | A' | B | A | B | o | o |
| Spatter preventive of Example 36 | A' | B | A | B | o | o |
| Spatter preventive of Example 37 | A | A' | B | A | Δ | Δ |
| Spatter preventive of Example 38 | B | B | A | B | o | o |
| Comparative material I | C | D | B | D | Δ | Δ |
| Comparative material II | D | E | C | D | x | o |
| Comparative material III | D | E | D | D | Δ | x |
| Comparative material IV | B | D | D | D | x | x |
| Comparative material V | C | D | B | D | Δ | o |
| Comparative material VI | C | D | B | D | Δ | Δ |

EXAMPLE 42

Two pieces of structural rolled steel for welding SM-41-A of JIS G-3106 (10 cm×15 cm×0.9 cm in size) were used as test specimens, and each specimen was dipped in each of the spatter preventive preparations of Examples 1-38 for 5 seconds and then heated at 150° C. for 15 minutes to remove the solvent or dispersing medium. Then $CO_2$ gas fillet welding was conducted on each specimen with a welding current of 300 A and an arc voltage of 25 V by using a core wire (2.0 mm in diameter) made of the same material as SM-41-A of JIS G-3106. The spatter preventing effect and relating persofmance of the tested spatter preventives were observed, the results being shown in Table 4.

Comparative materials I–VI used in Example 39 were also tested in the similar way.

spatter preventive preparations of Examples 1–38 for 10 seconds and then heated at 100° C. for 30 minutes to remove the solvent or dispersing medium. Then manual butt welding was conducted on waid specimens with a secondary current of 40 A and a secondary voltage of 10 V by using a welding rod D-5016 of JIS Z-3212 (1.6 mm in diameter), and the spatter preventing effect and

TABLE 4

Results of spatter preventing treatment on structural rolled steel for welding

| Agents tested | Spatter preventive effect[a] 1-layer build-up | 2-layer build-up | Joining[b] | Removability of residual spatter[c] | Platability[d] | Coatability[e] |
|---|---|---|---|---|---|---|
| Blank (no spatter preventive used) | E | E | A | D | o | o |
| Spatter preventive of Example 1 | A | A | A | A | o | o |
| Spatter preventive of Example 2 | A | A | A | A | o | o |
| Spatter preventive of Example 3 | A | A' | A | A | o | o |
| Spatter preventive of Example 4 | A' | B | A | B | o | o |
| Spatter preventive of Example 5 | A' | B | A | B | o | o |
| Spatter preventive of Example 6 | A | A | A | A | o | o |
| Spatter preventive of Example 7 | A' | A' | A | A | o | o |
| Spatter preventive of Example 8 | A' | A' | A | B | o | o |
| Spatter preventive of Example 9 | A | A' | A | A | o | o |
| Spatter preventive of Example 10 | A | A' | A | A | Δ | o |
| Spatter preventive of Example 11 | A | B | A | B | Δ | o |
| Spatter preventive of Example 12 | A | A' | B | A | o | o |
| Spatter preventive of Example 13 | A' | A' | A | A | Δ | o |
| Spatter preventive of Example 14 | A' | A' | A | A | Δ | o |
| Spatter preventive of Example 15 | A | A' | B | A | Δ | o |
| Spatter preventive of Example 16 | A' | A' | A | A | Δ | o |
| Spatter preventive of Example 17 | A' | B | A | B | o | o |
| Spatter preventive of Example 18 | A' | B | A | B | o | o |
| Spatter preventive of Example 19 | B | B | A | B | o | o |
| Spatter preventive of Example 20 | A' | B | A | A | Δ | o |
| Spatter preventive of Example 21 | A' | A' | B | A | Δ | o |
| Spatter preventive of Example 22 | A | A' | A | A | o | o |
| Spatter preventive of Example 23 | A' | B | A | B | o | o |
| Spatter preventive of Example 24 | A' | B | B | A | Δ | o |
| Spatter preventive of Example 25 | B | B | A | B | o | o |
| Spatter preventive of Example 26 | B | B | A | B | o | o |
| Spatter preventive of Example 27 | A' | A' | A | A | o | o |
| Spatter preventive of Example 28 | A' | A' | A | A | Δ | o |
| Spatter preventive of Example 29 | A' | A' | A | B | o | o |
| Spatter preventive of Example 30 | A' | B | B | A | Δ | o |
| Spatter preventive of Example 31 | B | B | A | B | o | o |
| Spatter preventive of Example 32 | A' | A' | A | B | o | o |
| Spatter preventive of Example 33 | A' | A' | A | B | o | o |
| Spatter preventive of Example 34 | A' | A' | B | B | o | o |
| Spatter preventive of Example 35 | A' | B | A | B | o | o |
| Spatter preventive of Example 36 | A' | B | A | B | o | o |
| Spatter preventive of Example 37 | A | A' | B | A | Δ | Δ |
| Spatter preventive of Example 38 | A' | B | A | B | o | o |
| Comparative material I | C | E | B | D | Δ | Δ |
| Comparative material II | D | E | C | D | x | o |
| Comparative material III | D | E | C | D | Δ | x |
| Comparative material IV | B | D | D | D | x | x |
| Comparative material V | C | E | B | D | Δ | o |
| Comparative material VI | C | E | B | D | Δ | Δ |

EXAMPLE 43

Two pieces of rolled steel for boiler SB-42-A of JIS G-3103 (15 cm × 15 cm × 1.2 cm in size) were used as test specmens. Each specimen was dipped in each of the relating performance of each spatter preventive were observed, obtaining the results shown in Table 5.

Comparative materials I–VI used in Example 39 were likewise tested.

TABLE 5

Results of spatter preventing treatment on rolled steel for boiler

| Agents tested | Spatter preventive effect[a] 1-layer build-up | 2-layer build-up | Joining[b] | Removability of residual spatter[c] | Platability[d] | Coatability[e] |
|---|---|---|---|---|---|---|
| Blank (no spatter preventive used) | E | E | A | D | o | o |
| Spatter preventive of Example 1 | A | A' | A | A | o | o |
| Spatter preventive of Example 2 | A | A' | A | A | o | o |
| Spatter preventive of Example 3 | A' | A' | A | B | o | o |
| Spatter preventive of Example 4 | A' | A' | A | B | o | o |
| Spatter preventive of Example 5 | A' | B | A | B | Δ | o |
| Spatter preventive of Example 6 | A | A' | A | A | o | o |
| Spatter preventive of Example 7 | A' | A' | A | A | o | o |
| Spatter preventive of Example 8 | A' | A' | A | B | o | o |

TABLE 5-continued

Results of spatter preventing treatment on rolled steel for boiler

| Agents tested | Spatter preventive effect[a] 1-layer build-up | 2-layer build-up | Joining[b] | Removability of residual spatter[c] | Platability[d] | Coatability[e] |
|---|---|---|---|---|---|---|
| Spatter preventive of Example 9 | A' | A' | A | A | o | o |
| Spatter preventive of Example 10 | A | A' | A | A | Δ | o |
| Spatter preventive of Example 11 | A' | B | A | B | o | o |
| Spatter preventive of Example 12 | A' | B | B | A | o | o |
| Spatter preventive of Example 13 | A' | A' | B | A | Δ | o |
| Spatter preventive of Example 14 | A' | B | B | A | Δ | o |
| Spatter preventive of Example 15 | A | A' | B | A | Δ | o |
| Spatter preventive of Example 16 | A' | B | B | A | Δ | o |
| Spatter preventive of Example 17 | A' | B | A | B | o | o |
| Spatter preventive of Example 18 | A' | B | A | B | o | o |
| Spatter preventive of Example 19 | B | B | A | B | o | o |
| Spatter preventive of Example 20 | A' | B | B | A | Δ | o |
| Spatter preventive of Example 21 | A' | A' | B | A | Δ | o |
| Spatter preventive of Example 22 | A | A' | A | B | o | o |
| Spatter preventive of Example 23 | B | B | A | B | o | o |
| Spatter preventive of Example 24 | A' | B | B | A | Δ | o |
| Spatter preventive of Example 25 | B | B | A | B | o | o |
| Spatter preventive of Example 26 | B | B | A | B | o | o |
| Spatter preventive of Example 27 | A' | B | A | A | o | o |
| Spatter preventive of Example 28 | A' | A' | A | B | Δ | o |
| Spatter preventive of Example 29 | A' | A' | A | B | o | o |
| Spatter preventive of Example 30 | A' | B | B | A | Δ | o |
| Spatter preventive of Example 31 | B | B | A | B | o | o |
| Spatter preventive of Example 32 | A' | B | A | B | o | o |
| Spatter preventive of Example 33 | A' | B | A | B | o | o |
| Spatter preventive of Example 34 | A' | A' | B | B | o | o |
| Spatter preventive of Example 35 | A' | B | A | B | o | o |
| Spatter preventive of Example 36 | A' | B | A | B | o | o |
| Spatter preventive of Example 37 | A | A' | B | A | Δ | Δ |
| Spatter preventive of Example 38 | B | B | A | B | o | o |
| Comparative material I | C | D | B | D | Δ | Δ |
| Comparative material II | D | D | C | D | x | o |
| Comparative material III | D | D | C | D | Δ | x |
| Comparative material IV | B | D | D | D | x | x |
| Comparative material V | C | D | B | D | o | o |
| Comparative material VI | C | D | B | D | Δ | Δ |

EXAMPLE 44

Two pieces of stainless steel 18-8 of SUS 304 (10 cm×15 cm×0.9 cm in size) were used as test specimens, and each specimen was sprayed with each of the spatter preventives of Examples 1–38 and then heated at 100° C. for 20 minutes to remove the solvent or dispersing medium. Then $CO_2$ gas fillet welding was conducted on each said specimen with a welding current of 300 A and an arc voltage of 25 V by using a core wire of SUS 304 (3.2 mm in diameter). The resulting spatter preventing effect and relating performance of said spatter preventives wer observed, the results being shown in Table 6.

Comparative materials I–VI used in Example 39 were similarly tested.

TABLE 6

Results of spatter preventing treatment on stainless steel 18-8

| Agents tested | Spatter preventing effect[a] 1-layer build-up | 2-layer build-up | Joining[b] | Removability or residual spatter[c] | Coatability[e] |
|---|---|---|---|---|---|
| Blank (no spatter preventive used) | E | E | A | D | o |
| Spatter preventive of Example 1 | A | A | A | A | o |
| Spatter preventive of Example 2 | A | A' | A | A | o |
| Spatter preventive of Example 3 | A | A' | A | A | o |
| Spatter preventive of Example 4 | A' | A' | A | B | o |
| Spatter preventive of Example 5 | A' | B | B | B | o |
| Spatter preventive of Example 6 | A | A' | A | A | o |
| Spatter preventive of Example 7 | A' | B | A | A | o |
| Spatter preventive of Example 8 | A' | A' | A | B | o |
| Spatter preventive of Example 9 | A | A' | A | A | o |
| Spatter preventive of Example 10 | A' | A' | A | A | o |
| Spatter preventive of Example 11 | A' | B | A | B | o |
| Spatter preventive of Example 12 | A' | B | B | A | o |
| Spatter preventive of Example 13 | A' | A' | B | A | o |
| Spatter preventive of Example 14 | A' | A' | B | B | o |
| Spatter preventive of Example 15 | A' | A' | B | A | o |
| Spatter preventive of Example 16 | A' | A' | B | B | o |
| Spatter preventive of Example 17 | A' | B | A | B | o |
| Spatter preventive of Example 18 | A' | B | A | B | o |
| Spatter preventive of Example 19 | B | B | A | B | o |
| Spatter preventive of Example 20 | A' | B | B | B | o |
| Spatter preventive of Example 21 | A' | A' | B | A | o |

TABLE 6-continued

Results of spatter preventing treatment on stainless steel 18-8

| Agents tested | Spatter preventing effect[a] | | | Removability or residual spatter[c] | Coatability[e] |
|---|---|---|---|---|---|
| | 1-layer build-up | 2-layer build-up | Joining[b] | | |
| Spatter preventive of Example 22 | A' | A' | A | A | o |
| Spatter preventive of Example 23 | A' | B | A | B | o |
| Spatter preventive of Example 24 | A' | B | B | A | o |
| Spatter preventive of Example 25 | B | B | A | B | o |
| Spatter preventive of Example 26 | B | B | A | B | o |
| Spatter preventive of Example 27 | A' | A' | A | A | o |
| Spatter preventive of Example 28 | A' | A' | A | A | o |
| Spatter preventive of Example 29 | A' | A' | A | B | o |
| Spatter preventive of Example 30 | A' | B | B | B | o |
| Spatter preventive of Example 31 | B | B | A | B | o |
| Spatter preventive of Example 32 | A' | A' | A | B | o |
| Spatter preventive of Example 33 | A' | B | A | B | o |
| Spatter preventive of Example 34 | A' | A' | B | B | o |
| Spatter preventive of Example 35 | A' | B | A | B | o |
| Spatter preventive of Example 36 | A' | B | A | B | o |
| Spatter preventive of Example 37 | A | A' | B | A | Δ |
| Spatter preventive of Example 38 | B | B | A | B | o |
| Comparative material I | C | E | B | D | Δ |
| Comparative material II | D | E | C | D | Δ |
| Comparative material III | D | E | D | D | x |
| Comparative material IV | B | E | D | D | x |
| Comparative material V | C | E | B | D | Δ |
| Comparative material VI | C | E | B | D | Δ |

EXAMPLE 45

Two pieces of structural cast steel for welding SCW-42 of JIS G-5201 (15 cm×15 cm×1.2 cm in size) were used as test specimens, and each specimen was dipped in each of the spatter preventive preparations of Examples 1-38 for 10 seconds and then allowed to stand at 20° C. and 40% RH for 24 hours to remove the solvent or dispersing medium. Then manual butt welding was conducted on each said specimen with a secondary current of 180 A and a secondary voltage of 20 V by using a welding rod D-5016 of JIS Z-3212 (4 mm in diameter), and the spatter preventing effect and relating performance of said spatter preventives were observed, obtaining the results shown in Table 7.

Comparative materials I-VI used in Example 39 were likewise tested.

TABLE 7

Results of spatter preventing treatment on structural cast steel for welding

| Agents tested | Spatter preventive effect[a] | | | Removability of residual spatter[c] | Platability[d] | Coatability[e] |
|---|---|---|---|---|---|---|
| | 1-layer build-up | 2-layer build-up | Joining[b] | | | |
| Blank (no spatter preventive used) | E | E | A | D | o | o |
| Spatter preventive of Example 1 | A | A' | A | A | o | o |
| Spatter preventive of Example 2 | A | A' | A | A | o | o |
| Spatter preventive of Example 3 | A | A' | A | B | o | o |
| Spatter preventive of Example 4 | A | A' | A | B | o | o |
| Spatter preventive of Example 5 | A' | B | A | B | Δ | o |
| Spatter preventive of Example 6 | A | A' | A | A | o | o |
| Spatter preventive of Example 7 | A' | A' | A | A | o | o |
| Spatter preventive of Example 8 | A | A' | A | B | o | o |
| Spatter preventive of Example 9 | A' | A' | A | A | o | o |
| Spatter preventive of Example 10 | A | A' | A | A | o | o |
| Spatter preventive of Example 11 | A' | A' | A | B | o | o |
| Spatter preventive of Example 12 | A' | B | B | A | o | o |
| Spatter preventive of Example 13 | A' | A' | B | A | Δ | o |
| Spatter preventive of Example 14 | A' | °A' | B | A | Δ | o |
| Spatter preventive of Example 15 | A' | B | B | A | Δ | o |
| Spatter preventive of Example 16 | A' | B | B | A | Δ | o |
| Spatter preventive of Example 17 | A' | B | A | B | o | o |
| Spatter preventive of Example 18 | A' | B | A | B | o | o |
| Spatter preventive of Example 19 | B | B | A | B | o | o |
| Spatter preventive of Example 20 | A' | B | B | A | Δ | o |
| Spatter preventive of Example 21 | A' | A' | B | A | Δ | o |
| Spatter preventive of Example 22 | A | A' | A | B | o | o |
| Spatter preventive of Example 23 | A' | B | A | B | o | o |
| Spatter preventive of Example 24 | A' | B | B | A | Δ | o |
| Spatter preventive of Example 25 | B | B | A | B | o | o |
| Spatter preventive of Example 26 | B | B | A | B | o | o |
| Spatter preventive of Example 27 | A' | B | A | B | o | o |
| Spatter preventive of Example 28 | A' | A' | A | A | Δ | o |
| Spatter preventive of Example 29 | A' | A' | A | B | o | o |
| Spatter preventive of Example 30 | A' | B | B | A | Δ | o |
| Spatter preventive of Example 31 | B | B | A | B | o | o |
| Spatter preventive of Example 32 | A' | B | A | B | o | o |
| Spatter preventive of Example 33 | A' | B | A | B | o | o |
| Spatter preventive of Example 34 | A' | A' | B | B | o | o |

TABLE 7-continued

Results of spatter preventing treatment on structural cast steel for welding

| Agents tested | Spatter preventive effect[a] 1-layer build-up | 2-layer build-up | Joining[b] | Removability of residual spatter[c] | Platability[d] | Coatability[e] |
|---|---|---|---|---|---|---|
| Spatter preventive of Example 35 | A' | B | A | B | o | o |
| Spatter preventive of Example 36 | A' | B | A | B | o | o |
| Spatter preventive of Example 37 | A | A' | B | A | Δ | Δ |
| Spatter preventive of Example 38 | A' | B | A | B | o | o |
| Comparative material I | C | D | B | D | Δ | Δ |
| Comparative material II | D· | E | C | D | x | o |
| Comparative material III | D | D | D | D | Δ | x |
| Comparative material IV | B | D | D | D | x | x |
| Comparative material V | C | D | B | D | o | Δ |
| Comparative material VI | C | D | B | D | Δ | Δ |

TABLE 8

| Example | $X_1, X_2, X_5, X_6, X_9, X_{10}, X_{13}$ and $X_{14}$ | $X_3, X_4, X_7, X_8, X_{11}$ and $X_{12}$ | $Y_1, Y_2, Y_3, Y_4, Y_5$ and $Y_6$ |
|---|---|---|---|
| 1 | Hydrogen | Hydrogen, halogen (Cl) | Hydrogen |
| 2 | Hydrogen | Hydrogen, halogen (Cl) | Hydrogen |
| 3 | Hydrogen | Hydrogen, halogen (Cl) | Hydrogen |
| 4 | Hydrogen | Halogen (Cl) | Hydrogen |
| 5 | Hydrogen, halogen (Br) | Halogen (Cl) | Hydrogen, halogen (Br) |
| 6 | Hydrogen, halogen (Br) | Hydrogen | Hydrogen, halogen (Br), vinyl, dihalo(Br)ethyl |
| 7 | Hydrogen, methyl, halogen (Cl) | Hydrogen, methyl | Hydrogen, methyl, halogen (Cl) |
| 8 | Hydrogen, methyl, ethyl, halogen (Cl) | Hydrogen, methyl | Hydrogen, methyl, ethyl, halogen (Cl) |
| 9 | Hydrogen | Hydrogen | Hydrogen, hydroxyl, halogen (Cl), epoxy, dihydroxyethyl, 2-halo(Cl)—1-hydroxyethyl, 1-halo(Cl)—2-hydroxyethyl, halo(Cl)ethyl |
| 10 | Hydrogen | Hydrogen | Hydrogen, hydroxyl, halogen(Br), epoxy, dihydroxyethyl, 2-halo(Br)—1-hydroxyethyl, 1-halo(Br)—2-hydroxyethyl, halo(Br)ethyl |
| 11 | Hydrogen | Hydrogen | Hydrogen, hydroxyl, halogen(I), epoxy, dihydroxyethyl, 2-halo(I)—1-hydroxyethyl, 1-halo(I)—2-hydroxyethyl, halo(I)ethyl |
| 12 | Hydrogen | Hydrogen | Hydrogen, $R'(C_{22}H_{45})\!\!-\!\!N\!\!-\!\!CH_2CH\!\!-\!\!$, $R''(HOC_8H_{16}-)$ $\quad$ OH |
| 13 | Hydrogen | Hydrogen | $R''''(ClC_2H_4)\!\!-\!\!OCH_2CH\!-\!,$ $R'(CH_3)\!\!-\!\!N\!\!-\!\!CH_2CH\!-\!$ OH $\quad R''(HOC_2H_4-)\quad$ OH |
| | | | Hydrogen, $R''''(C_{22}H_{45})\!\!-\!\!OCH_2CH\!-\!,$ OH |
| | | | $R''''(CH_3)\!\!-\!\!OCH_2CH\!-\!,$ OH |
| | | | $R''''(ClCH_2)\!\!-\!\!OCH_2CH\!-\!,$ OH |
| | | | $R''''(BrC_2H_4)\!\!-\!\!OCH_2CH\!-\!,$ OH |
| | | | $R'(H)\!\!-\!\!N\!\!-\!\!CH_2CH\!-\!,$ $R''(H)\quad$ OH |
| | | | $R'(HOCH_2)\!\!-\!\!NCH_2CH\!-\!,$ $R''(HOCH_2-)\quad$ OH |

TABLE 8-continued

| Example | $X_1$, $X_2$, $X_5$, $X_6$, $X_9$, $X_{10}$, $X_{13}$ and $X_{14}$ | $X_3$, $X_4$, $X_7$, $X_8$, $X_{11}$ and $X_{12}$ | $Y_1$, $Y_2$, $Y_3$, $Y_4$, $Y_5$ and $Y_6$ |
|---|---|---|---|
| | | | $R''''(HOCH_2 \!\!\rightarrow\!\! OCH_2CH\!-$<br>$\phantom{R''''(HOCH_2 \!\!\rightarrow\!\! OCH_2C}\|$<br>$\phantom{R''''(HOCH_2 \!\!\rightarrow\!\! OCH_2C}OH$ |
| 14 | Hydrogen | Hydrogen | Hydrogen, $R''''(HOC_8H_{16}\!\!\rightarrow\!\!OCH_2CH\!-$,<br>$\phantom{Hydrogen, R''''(HOC_8H_{16}\!\!\rightarrow\!\!OCH_2C}\|$<br>$\phantom{Hydrogen, R''''(HOC_8H_{16}\!\!\rightarrow\!\!OCH_2C}OH$ |
| | | | $R(C_{20}H_{41}\!\!\rightarrow\!\!CHCOOCH_2CH\!-$<br>$\phantom{R(C_{20}H_{41}\!\!\rightarrow\!\!}\|\phantom{CHCOOCH_2C}\|$<br>$\phantom{R(C_{20}H_{41}\!\!\rightarrow\!\!}A(Br)\phantom{CHCOO}OH$ |
| 15 | Hydrogen | Hydrogen | Hydrogen, $R(C_{20}H_{41}\!\!\rightarrow\!\!CHCOOCH_2CH\!-$,<br>$\phantom{Hydrogen, R(C_{20}H_{41}\!\!\rightarrow\!\!}\|\phantom{CHCOOCH_2C}\|$<br>$\phantom{Hydrogen, R(C_{20}H_{41}\!\!\rightarrow\!\!}A(H)\phantom{CHCOO}OH$ |
| | | | $R(C_{16}H_{31}\!\!\rightarrow\!\!CHCOOCH_2CH\!-$,<br>$\phantom{R(C_{16}H_{31}\!\!\rightarrow\!\!}\|\phantom{CHCOOCH_2C}\|$<br>$\phantom{R(C_{16}H_{31}\!\!\rightarrow\!\!}A(H)\phantom{CHCOO}OH$ |
| | | | $R(H)\!-\!CHCOOCH_2CH\!-$,<br>$\phantom{R(H)-}\|\phantom{CHCOOCH_2C}\|$<br>$\phantom{R(H)-}A(H)\phantom{CHCOO}OH$ |
| | | | $R(H)\!-\!CHCOOCH_2CH\!-$<br>$\phantom{R(H)-}\|\phantom{CHCOOCH_2C}\|$<br>$\phantom{R(H)-}A(Cl)\phantom{CHCOO}OH$ |
| 16 | Hydrogen, methyl | | Hydrogen, $R(C_{20}H_{41}\!\!\rightarrow\!\!CHCOOCH_2CHCH_2OC\!-$,<br>$\phantom{Hydrogen, }\phantom{R(C_{20}H_{41}\!\!\rightarrow\!\!}\|\phantom{CHCOOCH_2C}\|\phantom{CH_2O}\|$<br>$\phantom{Hydrogen, R(C_{20}H_{41}\!\!\rightarrow\!\!}A(H)\phantom{CHCOO}OH\phantom{CH_2}O$ |
| | | | $R(C_{20}H_{41}\!\!\rightarrow\!\!CHCOOCH_2CHCH_2OC\!-$,<br>$\phantom{R(C_{20}H_{41}\!\!\rightarrow\!\!}\|\phantom{CHCOOCH_2C}\|\phantom{CH_2O}\|$<br>$\phantom{R(C_{20}H_{41}\!\!\rightarrow\!\!}A(Br)\phantom{CHCOO}OH\phantom{CH_2}O$ |
| | | | $R(H)\!-\!CHCOOCH_2CHCH_2OC\!-$,<br>$\phantom{R(H)-}\|\phantom{CHCOOCH_2C}\|\phantom{CH_2O}\|$<br>$\phantom{R(H)-}A(H)\phantom{CHCOO}OH\phantom{CH_2}O$ |
| | | | $R(H)\!-\!CHCOOCH_2CHCH_2OC\!-$,<br>$\phantom{R(H)-}\|\phantom{CHCOOCH_2C}\|\phantom{CH_2O}\|$<br>$\phantom{R(H)-}A(Cl)\phantom{CHCOO}OH\phantom{CH_2}O$ |
| | | | $R'''(CH_3\!\!\rightarrow\!\!OC\!-$<br>$\phantom{R'''(CH_3\!\!\rightarrow\!\!O}\|$<br>$\phantom{R'''(CH_3\!\!\rightarrow\!\!O}O$ |
| 17 | Hydrogen, methyl | | Hydrogen, $R'(C_{22}H_{45}\!\!\rightarrow\!\!N\!-\!CH_2CHCH_2OC\!-$,<br>$\phantom{Hydrogen,}\phantom{R'(C_{22}H_{45}\rightarrow}R''(H)\phantom{-N-CH_2C}\|\phantom{CH_2O}\|$<br>$\phantom{Hydrogen, R'(C_{22}H_{45}\rightarrow N-CH_2C}OH\phantom{CH_2}O$ |
| | | | $R'(H)\!-\!N\!-\!CH_2CHCH_2OC\!-$<br>$R''(H)\!/\phantom{-N-CH_2C}\|\phantom{CH_2O}\|$<br>$\phantom{R''(H)/-N-CH_2C}OH\phantom{CH_2}O$ |
| | | | $R'(HOCH_2\!\!\rightarrow\!\!N\!-\!CH_2CHCH_2OC\!-$,<br>$R''(HOCH_2\!-\!)\!/\phantom{-N-CH_2C}\|\phantom{CH_2O}\|$<br>$\phantom{R''(HOCH_2-)/-N-CH_2C}OH\phantom{CH_2}O$ |
| | | | $R'(CH_3)\!-\!N\!-\!CH_2CHCH_2OC\!-$,<br>$R''(CH_3)\!/\phantom{-N-CH_2C}\|\phantom{CH_2O}\|$<br>$\phantom{R''(CH_3)/-N-CH_2C}OH\phantom{CH_2}O$ |
| | | | $R'''(ClCH_2\!\!\rightarrow\!\!OC\!-$<br>$\phantom{R'''(ClCH_2\rightarrow O}\|$<br>$\phantom{R'''(ClCH_2\rightarrow O}O$ |
| 18 | Hydrogen, methyl | | Hydrogen, $R'(HOC_8H_{16}\!\!\rightarrow\!\!N\!-\!CH_2CHCH_2OC\!-$,<br>$\phantom{Hydrogen,}\phantom{R'(HOC_8H_{16}\rightarrow}R''(HOC_2H_4\!-\!)\!/\phantom{N-CH_2C}\|\phantom{CH_2O}\|$<br>$\phantom{Hydrogen, R'(HOC_8H_{16}\rightarrow N-CH_2C}OH\phantom{CH_2}O$ |
| | | | $R'''(ClC_2H_4\!\!\rightarrow\!\!OC\!-$<br>$\phantom{R'''(ClC_2H_4\rightarrow O}\|$<br>$\phantom{R'''(ClC_2H_4\rightarrow O}O$ |

TABLE 8-continued

| Example | $X_1$, $X_2$, $X_5$, $X_6$, $X_9$, $X_{10}$, $X_{13}$ and $X_{14}$ | $X_3$, $X_4$, $X_7$, $X_8$, $X_{11}$ and $X_{12}$ | $Y_1$, $Y_2$, $Y_3$, $Y_4$, $Y_5$ and $Y_6$ |
|---|---|---|---|
| 19 | Hydrogen, methyl | | Hydrogen, R'(H)R"(H)N—C(=O)—, R""(BrCH₂⫤OCH₂CH(OH)CH₂OC(=O)— |
| 20 | Hydrogen, methyl | | Hydrogen, halo(Cl)methyl, R""(HOC₈H₁₆⫤OC(=O)—, R""(HOC₈H₁₆⫤OCH₂CH(OH)CH₂OC(=O)—, R""(ClC₂H₄⫤OCH₂CH(OH)CH₂OC(=O)—, R""(C₂₂H₄₅⫤OCH₂CH(OH)CH₂OC(=O)—, R""(HOCH₂⫤OCH₂CH(OH)CH₂OC(=O)— |
| 21 | Hydrogen | | Hydrogen, R(H)—CH(A(H))COO—, R(C₂₀H₄₁⫤CH(A(H))COO—, R(C₂₀H₄₁⫤CH(A(Br))COO— |
| 22 | Hydrogen | | Hydrogen, hydroxyl, R(H)—CH(A(H))COO—, R(H)—CH(A(Cl))COO— |
| 23 | Hydrogen, methyl | Hydrogen | Hydrogen, R'''(CH₃⫤OC(=O)—, R'''(ClCH₂⫤OC(=O)— |
| 24 | Hydrogen | | Hydrogen, halo(Cl)phenyl, R'''(CH₃⫤CO(=O)— |
| 25 | Hydrogen | | Hydrogen, C₆H₅—, carboxyl |
| 26 | Hydrogen | | Hydrogen, CH₃C₆H₄—, R'''(C₂₂H₄₅⫤OC(=O)—, R'''(ClC₂H₄⫤OC(=O)—, R'''(HOC₈H₁₆⫤OC(=O)—, R'''(HOCH₂⫤OC(=O)— |
| 27 | Hydrogen, halogen (Br) | Hydrogen | Hydrogen, halogen (Br), nitrile |
| 28 | Hydrogen, halogen (Cl) | Hydrogen | Hydrogen, halogen (Cl), C₆H₅—, halo(Cl)phenyl |
| 29 | Hydrogen | Hydrogen | Hydrogen, hydroxyl, dihydroxyethyl, 2-halo(Cl)—1-hydroxyethyl, 1-(halo(Cl)-2-hydroxyethyl |
| 30 | Hydrogen | | Hydrogen, C₂₂H₄₅—, R'''(ClC₂H₄⫤OC(=O)— |

TABLE 8-continued

| Example | $X_1, X_2, X_5,$ $X_6, X_9, X_{10},$ $X_{13}$ and $X_{14}$ | $X_3, X_4, X_7, X_8,$ $X_{11}$ and $X_{12}$ | $Y_1, Y_2, Y_3, Y_4, Y_5$ and $Y_6$ |
|---|---|---|---|
| | | | R'''(ClCH$_2$CHCH$_2$)$-$OC$-$<br>                     \|          \|\|<br>                     OH     O |
| | | | Hydrogen, R(H)$-$CHCOO$-$, ClCH$_2$CHCH$_2$O$-$,<br>                  \|                      \|<br>                  A(H)              OH |
| | | | HOCH$_2$O$-$, HOC$_8$H$_{16}$O$-$ |
| 31 | Hydrogen | | Hydrogen, R(H)$-$CHCOO$-$, ClCH$_2$CHCH$_2$O$-$,<br>                  \|                      \|<br>                  A(H)              OH<br>HOCH$_2$O$-$, HOC$_8$H$_{16}$O$-$ |
| 32 | Hydrogen, methyl | Hydrogen | Hydrogen, R'''(HOCH$_2$CHCH$_2$)$-$OC$-$<br>                      \|           \|\|<br>                      Cl      O |
| 33 | Hydrogen | | Hydrogen, halogen (Cl), R(H)$-$CHCOO$-$<br>                                     \|<br>                                   A(H) |
| 34 | Hydrogen, halogen (Cl) | | Hydrogen, halogen (Cl) |
| 35 | Hydrogen | | Hydrogen, methyl, halo(Cl)methyl |
| 36 | Hydrogen, halogen (Cl) | | Hydrogen, halogen (Cl) |
| 37 | Halogen (F) | | Halogen (F) |
| 38 | Hydrogen | | Hydrogen, halo(Cl)methylphenyl,<br>R'(C$_{22}$H$_{45}$)$-$N$-$C$-$,<br>R''(CH$_3$)<br>R'(HOC$_8$H$_{16}$)$-$N$-$C$-$, R'''(HOCH$_2$)$-$OC$-$<br>R''(HOCH$_2$$-$) |

As seen from the above, the excellent performance in spatter prevention according to the method of this invention owing to the especial contribution of the spatter preventive of this invention to the adsorption of C-X joint in the iron surface (force in the vertical direction) has been confirmed from the various aspects.

What is claimed is:

1. A spatter preventing method which comprises
   (i) spreading on the surface of a material to be welded, one or more halogen-containing two-dimensional polymers of the general formula I (shown below) dissolved, emulsified or dispersed in water or an organic solvent to form a film of said polymer having a proper degree of affinity for metals and other materials, being thermoplastic and also having a restoring force and flame resistance, and thereafter
   (ii) conducting the welding operation, Formula I:

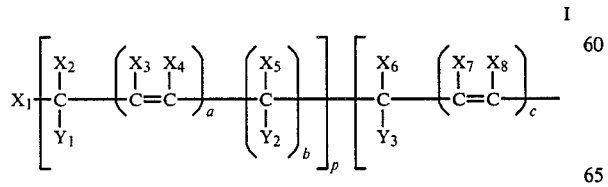

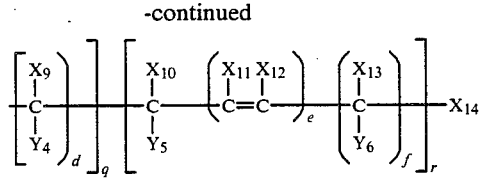

(wherein $X_1, X_2, X_5, X_6, X_9, X_{10}, X_{13}$ and $X_{14}$ represent a member selected from the group consisting of hydrogen, halogen, methyl group and ethyl group; $X_3, X_4, X_7, X_8, X_{11}$ and $X_{12}$ are paired into $X_3$ and $X_4$, $X_7$ and $X_8$, and $X_{11}$ and $X_{12}$, in each of which pairs one or both are hydrogen or halogen, or one is hydrogen and the other is methyl group; $Y_1, Y_2, Y_3, Y_4, Y_5$ and $Y_6$ represent a member selected from the group consisting of hydrogen, halogen, hydrocarbon group having 22 or less carbon atoms, halomethyl group, haloethyl group, dihaloethyl group, halophenyl group, halomethylphenyl group, hydroxyl group, 3-halo-2-hydroxypropoxy group, hydroxyalkoxy group having 8 or less carbon atoms, carboxyl group, nitrile group, epoxy group, dihyroxyethyl group, 2-halo-1-hydroxyethyl group, 1-halo-2-hydroxyethyl group,

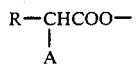

group (wherein R represents hydrogen or hydrocarbon group having 20 or less carbon atoms, and A represents hydrogen or halogen),

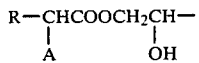

group (wherein R represents hydrogen or hydrocarbon group having 20 or less carbon atoms, and A represents hydrogen or halogen),

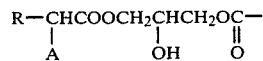

group (wherein R represents hydrogen or hydrocarbon group having 20 or less carbon atoms, and A represents hydrogen or halogen),

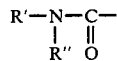

group (wherein R' and R'' represent a member selected from the group consisting of hydrogen, hydrocarbon group having 22 or less carbon atoms, and hydroxyhydrocarbon group having 8 or less carbon atoms),

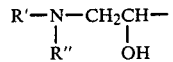

group (wherein R' and R'' represent a member selected from the group consisting of hydrogen, hydrocarbon group having 22 or less carbon atoms, and hydroxyhydrocarbon group having 8 or less carbon atoms),

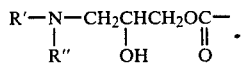

group (wherein R' and R'' represent a member selected having 22 or less carbon atoms, and hydroxyhydrocarbon group having 8 or less carbon atoms),

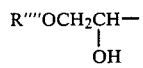

group (wherein R''' represents a member selected from the group consisting of halomethyl group, haloethyl group, hydroxyhalopropyl group, hydrocarbon group having 22 or less carbon atoms, and hydroxyhydrocarbon group having 8 or less carbon atoms),

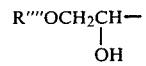

group (wherein R'''' represents a member selected from the group consisting of halomethyl group, haloethyl group, hydrocarbon group having 22 or less carbon atoms, and hydroxyhydrocarbon group having 8 or less carbon atoms), and

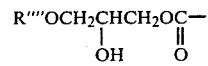

group (wherein R'''' represents a member selected from the group consisting of halomethyl group, haloethyl group, hydrocarbon group having 22 or less carbon atoms, and hydroxyhydrocarbon group having 8 or less carbon atoms); a, b, c, d, e and f represent a number of 0 or 1, at least one of them representing 1; and p, q and r are the numbers saatisfying the following relations: $0 \leq p \leq 10,000$, $0 \leq q \leq 10,000$, $0 \leq r \leq 10,000$, and $50 \leq p+q+r \leq 10,000$, and wherein at least one of $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $Y_1$, $Y_2$, $Y_3$, $Y_4$, $Y_5$ and $Y_6$ is halogen or halogen-containing group).

2. The spatter preventing method according to claim 1, wherein the polymer of formula I is a polymer of 2-chlorobutadiene.

3. The spatter preventing method according to claim 1, wherein the polymer of formula I is a copolymer of vinyl chloride and vinylidene chloride.

4. The spatter preventing method according to claim 1, wherein the polymer of formula I is a polymer of tetrafluoroethylene.

5. The spatter preventing method according to claim 1, wherein the polymer of formula I is chlorinated polypropylene.

6. The spatter preventing method according to claim 1, wherein the polymer of formula I is brominated polybutadiene.

7. The spatter preventing method according to claim 1, wherein the polymer of formula I is a hydrochloric acid addition product of epoxidized polybutadiene.

8. The spatter preventing method according to claim 1, wherein the polymer of formula I is a hydrobromic acid addition product of epoxidized polybutadiene.

9. The spatter preventing method according to claim 1, wherein the polymer of formula I is a copolymer of vinyl chloride and vinyl acetate.

10. The spatter preventing method according to claim 1, wherein the polymer of formula I is chlorinated polyisoprene.

* * * * *